United States Patent [19]

Regelsberger

[11] 4,365,962

[45] Dec. 28, 1982

[54] SAFETY CLUTCH FOR POWER-OPERATED HAND-HELD TOOL

[75] Inventor: Wolfgang Regelsberger, Weissenburg, Fed. Rep. of Germany

[73] Assignee: Hilti Aktiengesellschaft, Schaan, Liechtenstein

[21] Appl. No.: 203,478

[22] Filed: Nov. 3, 1980

[30] Foreign Application Priority Data

Nov. 2, 1979 [DE] Fed. Rep. of Germany ....... 2944275

[51] Int. Cl.³ .......................................... F16D 9/00

[52] U.S. Cl. ................................ 464/39; 74/412 TA; 192/56 R; 192/150

[58] Field of Search ............................ 192/56 R, 150; 74/412 TA; 64/28 R, 29, 15 C, 30 R, 30 E, 30 A, 15 R, 15 B; 464/37-39

[56] References Cited

U.S. PATENT DOCUMENTS

| | | | |
|---|---|---|---|
| 1,651,822 | 12/1927 | Johnston | 64/15 B |
| 1,657,274 | 1/1928 | Niedhammer | 64/29 X |
| 3,018,866 | 1/1962 | Elliott et al. | 64/29 X |
| 3,688,522 | 9/1972 | Schmuck | 64/29 |
| 3,835,666 | 9/1974 | Hoffman | 64/29 X |
| 4,081,704 | 3/1978 | Vassos et al. | 74/412 TA |
| 4,220,230 | 9/1980 | Hansen | 64/29 X |
| 4,291,553 | 9/1981 | Kato et al. | 64/29 |

*Primary Examiner*—John Petrakes
*Attorney, Agent, or Firm*—Toren, McGeady and Stanger

[57] ABSTRACT

In a motor operated hand-held tool, such as a hammer drill, a drive train transmits driving force from a motor to a drive spindle. The drive train includes a safety clutch positioned on a shaft for interrupting the transmission of driving force if a torque overload occurs. The safety clutch has a hub encircled by a gear ring with spring-biased balls releasably interengaging the hub and ring for transmitting the driving force. The hub is engaged with a thread on the shaft and under normal operation a spring prevents the hub from being rotated relative to the shaft and being displaced axially along the shaft. During torque overload conditions the hub acting against the spring moves axially along the shaft until the hub and gear ring are released.

6 Claims, 2 Drawing Figures

SAFETY CLUTCH FOR POWER-OPERATED HAND-HELD TOOL

SUMMARY OF THE INVENTION

The invention relates to a power-operated, hand-held tool, such as a hammer drill, with a safety clutch located in the drive chain between a drive motor and a work spindle with the clutch interrupting the transmission of force in the event of a torque overload. The safety clutch includes a hub positioned on a shaft and a ring or rim releasably connected to the hub by clutch members.

In power-operated, hand-held tools, such as hammer drills, the tool becomes jammed and, therefore, the transmission of the driving force is blocked. Jamming of the tool can be caused, for example by contacting reinforcing steel when drilling through concrete. When a tool is used on wood, the danger of jamming is caused by knots in the wood. To protect the drive motor and also the person using the tool, safety clutches are usually mounted in such tools and interrupt the transmission of force if a torque overload occurs.

Known safety clutches are designed so that the torque remaining after the safety clutch has been disengaged can be easily handled by a person using the tool. It has been found, however, that extremely high torque values occur up until the time the safety clutch operates. Such high torques act suddenly on a person using the tool and can lead to the possibility of an accident, especially if the tool operator is working at a dangerous location, such as on a scaffold, a ladder or the like.

The primary object of the present invention is to improve the operational safety of a hand-held tool of the above-mentioned type.

In accordance with the present invention, a shaft threaded for at least a portion of its length mounts the safety clutch and the clutch includes a hub having projections which engage into the thread of the shaft. For the transmission of torque, a spring element biases the hub on the shaft and prevents it from rotational movement relative to the shaft which would result in axial movement along the shaft.

Accordingly, the hub of the safety clutch is not rigidly connected to the shaft on which the clutch is mounted. When the work spindle and, as a result, the shaft in engagement with the spindle are blocked from rotation, the safety clutch does not have to be released immediately. In accordance with the present invention, when a torque overload occurs the hub of the safety clutch can be displaced axially along the thread on the shaft. When the hub moves along the shaft, the spring element biasing the hub is tensioned to an increasing degree. The safety clutch is disengaging when the hub contacts a rigid stop or when the increasing force of the spring element exceeds the axial force generated by the threaded connection between the hub and the shaft. By appropriately sizing the spring element, the torque increases slowly as it approaches the torque required for the disengagement of the safety clutch. During this time, the tool operator can either turn off the power to the drill or can apply an appropriate countertorque. Therefore, the possibility of an accident is practically eliminated.

In connecting the hub with the shaft, the projections on the hub engaging the thread on the shaft can be in the form of an internal thread. When such an internal thread is used, it must be noted that if the work spindle is blocked, the response time of the safety clutch depends on the pitch angle of the thread, that is, the response time increases as the pitch angle decreases. To provide for the possibility of using a smaller pitch angle on the thread, the friction between the shaft and the hub must be reduced. To effect such a reduction, it is advantageous if the projections on the hub are in the form of the balls of a ball spindle. By means of such a ball spindle, the sliding friction is replaced by a significantly lower rolling friction. Since the rolling friction is less dependent upon the state of lubrication and, thus, indirectly less dependent upon the temperature, it is possible to achieve a higher operational safety of the device in accordance with the present invention.

After the hub has been screwed in the axial direction along the shaft due to the torque overload or blocking of the rotation of the work spindle, it is necessary to return the hub in the axial direction along the shaft to place the tool in condition ready for operation. To assure that the return of the hub is effected automatically by the force of the spring element, it is advantageous if the threads of the shaft of the hub are dimensioned so that they are not in the self-locking range. Accordingly, if the power to the tool is switched off, the hub can be returned to its original position by the spring element. Considering the frictional conditions common in metallic contact, a thread of coarse pitch is required for a secure operation.

The spring element biasing the hub must have a great working storage capacity and, especially, a relatively great working traverse. Since the space available for such a member is limited, it is advantageous if the spring element is a compression spring. By selecting the spring characteristic and providing an appropriate amount of tensioning, the delay time until the response of the safety clutch to torque overload can be fixed quite accurately.

During normal operation, the shaft and the hub rotate at the same speed. To prevent any unnecessary friction, it is advantageous that the spring element is axially supported on the shaft. When the work spindle is blocked, the shaft is also held from rotating. Through appropriate frictional conditions, it can be provided that the spring element rotates at a slower speed than the hub, so that the relative motion at the contact surfaces with the shaft or with the hub and the resulting wear are reduced.

The various features of novelty which characterize the invention are pointed out with particularity in the claims annexed to and forming a part of this disclosure. For a better understanding of the invention, its operating advantages and specific objects attained by its use, reference should be had to the accompanying drawings and descriptive matter in which there are illustrated and described preferred embodiments of the invention.

DETAIL DESCRIPTION OF THE INVENTION

Figure 1:
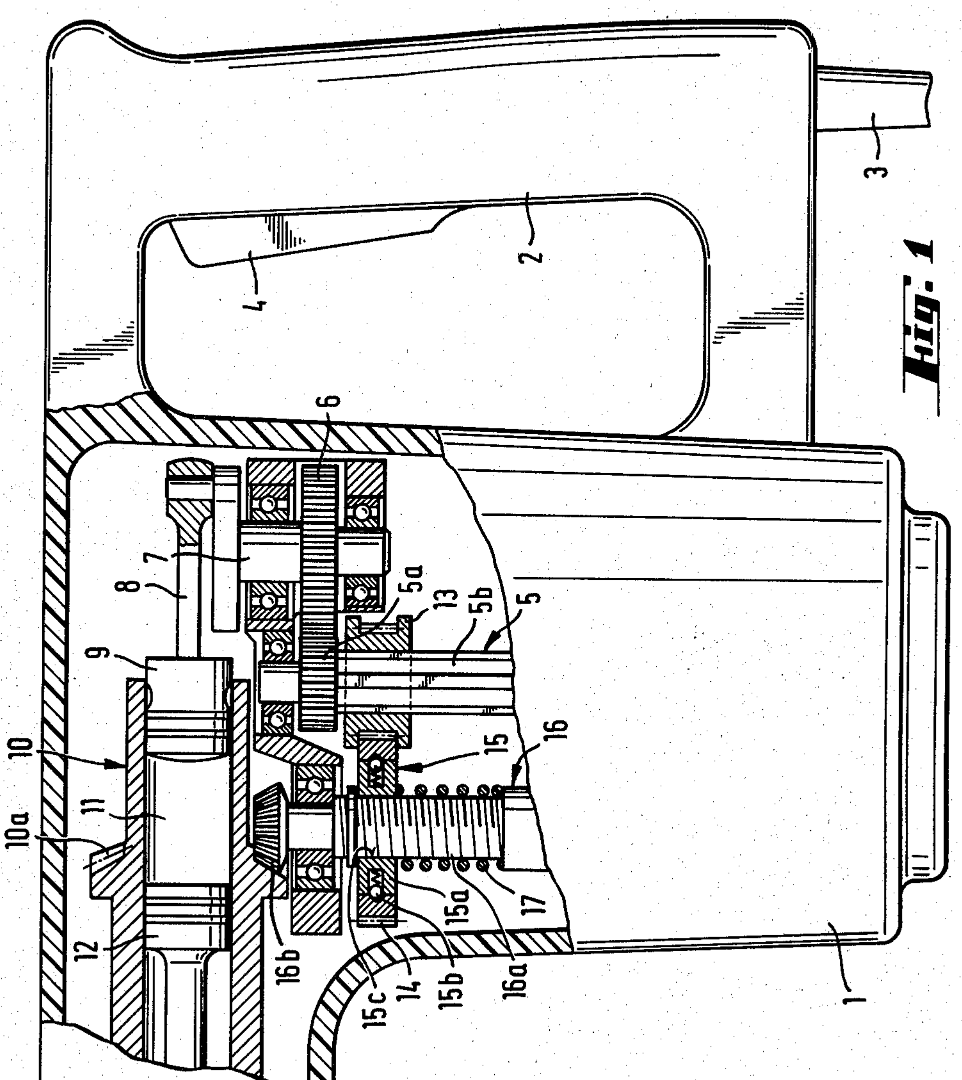
FIG. 1 is a side view, partly in section, of a power-operated hand-held tool embodying the present invention.

In FIG. 1 a hammer drill embodying the present invention is illustrated and includes a housing 1 having a handle 2 located at one end. A power feed line 3 extends into the handle 2 and supplies the electrical energy for operating the drill. Further, a trigger 4 is mounted in the handle by means of which the hammer drill is operated. A drive motor known per se and not shown, is located within the housing 1. Drive shaft 5 coupled to the motor shaft or formed integrally with it extends upwardly through the housing. A pinion 5a is mounted on the end of the drive shaft 5 more remote from the drive motor. Pinion 5a is in meshed engagement with a gear 6 secured on a crank shaft 7. Reciprocating motion is imparted to an excitor piston 9 by the crank shaft 7 through a connecting rod 8 eccentrically attached to the crank shaft. Piston 9 is guided within a cylinder 10 rotatably supported in the housing 1. The percussive force generated by the excitor piston 9 is transmitted to a percussion piston 12 by an air cushion 11 located between the two pistons.

Shaft 5 includes a splined shaft portion 5b on which a slide wheel is fixed for rotation with the shaft, however, it is also axially slidable along the shaft. Slide wheel 13 is in meshed engagement with a gear ring 14. A safety clutch 15 is arranged in the interior of the gear ring 14. Safety clutch 15 consists of a hub 15a and balls 15b located in radially extending bores open at the outer circumferential periphery of the hub 15a. In the event of a torque overload, the balls 15b move against the biasing action of the springs in the bores interrupting the transmission of force between the gear ring 14 and the hub 15a. Hub 15a is positioned on a shaft 16. A portion 16a of the shaft 16, on which the hub 15a is positioned, is threaded. In FIG. 1, the hub 15a has an internal thread 15c in threaded engagement with the threaded portion 16a of the shaft 16. Accordingly, due to its threaded interengagement, the hub 15a can be screwed on, that is, moved axially along, the shaft 16. A spring element 17 in the form of a compression spring laterally encircling the threaded shaft portion 16a biases the hub 15a against axial movement along the shaft 16. The threaded shaft portion 16a and the internal thread 15c on the hub are dimensioned so that the two parts are not in the self-locking range. Accordingly, the compression spring 17 can overcome the friction existing between the hub 15a and the shaft 16 and automatically return the hub 15a into the illustrated position when the torque overload is released.

A bevel pinion 16b is fixed on the end of shaft 16 adjacent the cylinder 10. Bevel pinion 16b engages bevel gear teeth 10a formed on the cylinder 10. Accordingly, rotational motion is imparted to the cylinder 10 by the drive shaft 5 via the slide wheel 13, the gear ring 14, safety clutch 15 and the shaft 16. A work spindle 18 is fixed to the end of the cylinder extending from the front end of the housing 1, that is the end opposite the handle 2. The spindle rotates with the cylinder. If, during operation, the work spindle 18 is blocked from continued rotation due to jamming of a tool 19 positioned in the work spindle 18, the shaft 16 is also brought to a standstill. If the safety clutch does not release, then the hub continues to rotate. With the shaft 16 held against rotation, the hub 15a is screwed around the external thread 16a of the shaft 16 against the biasing action of the compression spring 17. For continued compression of the spring 17 an increasing torque is required. After the hub 15a executes a certain number of rotations about the shaft 16 which are adjustable by the spring characteristic of the balls 15b and the compression spring 17, the torque developed exceeds the torque needed to release or disengage the safety clutch. The time required to attain the disengaging action of the safety clutch 15, results in a time delay for the response of the safety clutch. Accordingly, it is possible for the operator to release the trigger 4 and thereby switch off the tool. When work is performed which requires a torque slightly lower than the torque for releasing the clutch, the operator can prepare himself for the occurrence of such peak torques or forces. After the tool has been turned off, the hub 15a and with it the gear rim 14 and the slide wheel 13 are returned to the illustrated initial position by the compression spring 17.

Figure 2:
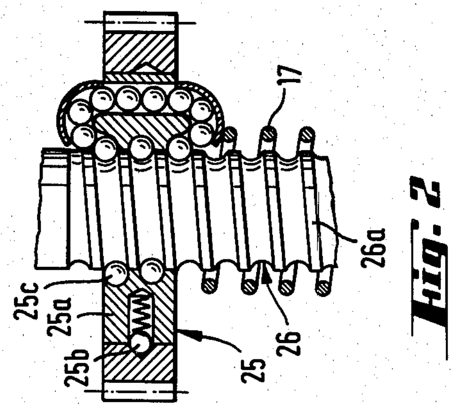
FIG. 2 is a partial sectional view of another embodiment of the present invention.

The detail of another embodiment of the engagement between the hub and the shaft is shown in FIG. 2. Safety clutch 25 includes hub 25a and spring biased balls 25b arranged in radially extending bores open at the outer circumferential periphery of the hub. Hub 25a is connected to a shaft 26. In the region of the connection of the hub 25a to the shaft 26, the shaft has a spindle-like thread 26a. The connection between the hub 25a and the spindle-like thread 26a is effected through projections or balls 25c. In principle, this arrangement operates exactly in the same manner as the embodiment illustrated in FIG. 1. Due to the significantly lower rolling friction in this arrangement, however, the pitch angle of the thread can be chosen smaller so that, for the available axial shifting path, more revolutions and, thus, a longer delay time is required.

While specific embodiments of the invention have been shown and described in detail to illustrate the application of the inventive principles, it will be understood that the invention may be embodied otherwise without departing from such principles.

What is claimed is:

1. Motor-operated hand-held tool, such as a hammer drill, comprising a work spindle, a drive train including a drive motor and a drive spindle for transmitting driving force from said drive motor to said drive spindle, said drive train includes a shaft and a safety clutch positioned on said shaft for interrupting the transmission of driving force to said work spindle in the event a torque overload is developed, said shaft being threaded for at least an axially extending portion of the length thereof, a gear ring spaced outwardly from said shaft, said safety clutch arranged to releasably engage said gear ring and said shaft, said safety clutch comprises a hub mounted on said shaft within said gear ring and clutch members releasably interengaging said gear ring and hub, means for interengaging said hub with said thread on said shaft, and a spring acting on said hub for preventing said hub from being rotated relative to said shaft and screwed on said thread for movement in the axial direction thereof until a torque overload is experienced causing said hub to rotate relative to said shaft and move axially along said thread thereon to a point where said clutch members release said gear ring and hub from engagement.

2. Motor-operated hand-held tool, as set forth in claim 1, wherein said means for interengaging said hub with said thread comprises an internal thread within said hub in threaded engagement with the thread on said shaft.

3. Motor-operated hand-held tool, as set forth in claim 1, wherein said shaft has a spindle-like thread, and said means for interengaging said hub with said spindle-like thread on said shaft comprising balls positioned in the spindle-like thread on said shaft and in corresponding grooves in said hub.

4. Motor-operated hand-held tool, as set forth in claims 1, 2 or 3, wherein said thread on said shaft and said means for interengaging said hub with said thread on said shaft being out of the range of self-locking so that said spring acting on said hub can return said hub to the normal operating position on said shaft.

5. Motor-operated hand-held tool, as set forth in claim 1, wherein said spring comprises a compression spring.

6. Motor-operated hand-held tool, as set forth in claim 5, wherein said spring is axially supported on said shaft.

* * * * *